(12) United States Patent
Okamoto et al.

(10) Patent No.: US 6,342,316 B1
(45) Date of Patent: Jan. 29, 2002

(54) FUEL CELL GENERATION SYSTEM

(75) Inventors: Masaru Okamoto; Kazuo Saito; Masatoshi Iio, all of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/515,856

(22) Filed: Feb. 29, 2000

(30) Foreign Application Priority Data

Mar. 3, 1999 (JP) .......................................... 11-055855

(51) Int. Cl.$^7$ ................................................ H01M 8/18
(52) U.S. Cl. ............................ 429/19; 429/12; 429/13; 429/17; 429/22; 429/25
(58) Field of Search ............................ 429/12, 13, 17, 429/19, 22, 25

(56) References Cited

U.S. PATENT DOCUMENTS

| | | | | |
|---|---|---|---|---|
| 4,923,768 A | * | 5/1990 | Kaneko et al. | 429/19 |
| 5,401,589 A | * | 3/1995 | Palmer et al. | 429/13 |
| 5,441,821 A | * | 8/1995 | Merritt et al. | 429/17 |

FOREIGN PATENT DOCUMENTS

JP  5-036429  2/1993

* cited by examiner

*Primary Examiner*—Gabrielle Brouillette
*Assistant Examiner*—Angela J. Martin
(74) *Attorney, Agent, or Firm*—Foley & Lardner

(57) ABSTRACT

A fuel cell generation system of the invention includes a reforming apparatus; a fuel cell; a reformed gas flow rate control section controlling a flow rate of reformed gas flowing from the reforming apparatus so that an operating pressure of the reforming apparatus is equal to its target pressure; a reformed gas flow rate detecting section detecting a flow rate of the reformed gas flowing into the fuel cell; a target load current calculating section calculating a target load current taken out of the fuel cell in accordance with the flow rate of the reformed gas detected by the reformed gas flow rate detecting section so that an operating pressure of the fuel cell is equal to its target pressure; an inlet pressure detecting section detecting an inlet pressure of the fuel cell; a target load current correction quantity calculating section calculating a load current correction quantity in accordance with a deviation between the inlet pressure of the fuel cell detected by the inlet pressure detecting section and the target pressure of the fuel cell; and a correction quantity adding section adding the target load current calculated by the target load current calculating section and the load current correction quantity calculated by the target load current correction quantity calculating section.

12 Claims, 2 Drawing Sheets

FUEL CELL GENERATION SYSTEM

BACKGROUND OF THE INVENTION

The present invention relates to a fuel cell generation system and particularly relates to a fuel cell generation system for reforming a material fuel to obtain a reformed gas having a high hydrogen content, i.e. hydrogen rich, supplying the reformed gas and oxygen containing gas to a fuel cell in which the reformed gas and oxygen containing gas are reacted to each other to thereby generate power.

Japanese Patent Application Laid-Open publication No. 5-036429 discloses a fuel cell generation system including a reforming apparatus for reforming material fuel gas and manufacturing reformed gas having a high hydrogen content and causing the obtained reformed gas to react to oxygen containing gas supplied separately to thereby generate power.

This fuel cell generation system controls and regulates the flow rate of the material fuel introduced into the reforming apparatus in accordance with the variation of load power required by an external load.

If the power requirement from the external load rapidly increases and the generation of the reformed gas supplied from the reforming apparatus cannot follow up the requirement due to the large increase of the requirement, the excess current-carrying to a pseudo-load arranged in advance in addition to the external load is reduced so as to satisfy the required power supply.

SUMMARY OF THE INVENTION

According to the studies done by the inventors of the present invention, however, the conventional fuel cell generation system has disadvantages such that it is not sufficiently taken into consideration to maintain operating pressures of both a reforming apparatus for reforming a material fuel and a fuel cell for causing a reaction between a reformed gas and an oxygen containing gas to thereby generate power. This makes it difficult to maintain the operating pressures in an appropriate manner.

Namely, if the flow rate of the material fuel is varied in accordance with the variation of the external load, the quantity of a reformed gas generated by the reforming apparatus is varied, as well. The variation of the quantity of the reformed gas thus generated causes that of the internal pressure of the reforming apparatus.

Nevertheless, due to the fact that the appropriate maintenance of the operating pressure within the reforming apparatus is not sufficiently taken account of in the conventional system, there is a possibility that the internal pressure of the reforming apparatus reaches the upper or lower operating pressure limit.

If the quantity of the reformed gas generated in the reforming apparatus varies according to the variation of the flow rate of the material fuel, then the quantity of the reformed gas supplied to the fuel cell is also varied, which variation, in turn, causes the variation of the internal pressure of the fuel cell.

Here again, due to the fact that the appropriate maintenance of the operating pressure within the fuel cell is not sufficiently taken account of, there is a possibility that the internal pressure of the fuel cell reaches the upper or lower operating pressure limit.

Furthermore, in both of the reforming apparatus and the fuel cell, it is required to operate them while changing the target appropriate operating pressures according to the variation of an external load, respectively. Besides, it is required to change the upper and lower operating pressure limits of the operating pressures according to the variation of the external load, respectively.

As can be seen from the above, if the upper and lower limits of the operating pressures of the reforming apparatus and the fuel cell vary according to the variation of the external load, respectively and the target operating pressures of the reforming apparatus and the fuel cell vary according to the variation of the external load, respectively, then it may be very difficult to maintain the target appropriate operating pressures of the reforming apparatus and the fuel cell, respectively.

Judging from the above, according to the conventional fuel cell generation system, there is a possibility the balance between the pressure of the reforming apparatus and that of the fuel cell is difficult to keep appropriately and, therefore, the operation of the overall fuel cell generation system cannot continue well.

Aside from the above studies, the fuel cell is constructed to generate power as a result of the reaction between the supplied reformed gas and the oxygen containing gas. Due to this, the load power which can be taken out from the fuel cell depends on the quantity of the supplied reformed gas and that of the supplied oxygen containing gas.

Among these gases, the oxygen containing gas is not supplied by generating an oxygen gas through a chemical reaction but supplied as air from an external air supply unit. Thus, the supply quantity of the oxygen containing gas can be controlled easily as required.

On the other hand, the reformed gas is generated by the reforming apparatus. Owing to this, the chemical reaction of the reformed gas causes a time delay and the quantity of the generated reformed gas is difficult to determine in an accurate manner.

In this way, the power generation in the fuel cell mainly depends on the supply quantity of the reformed gas. Thus the load power which can be taken out from the fuel cell mainly depend on the quantity of the reformed gas supplied to the fuel cell.

According to the conventional fuel cell generation system, however, the actual load power taken out from the fuel cell is not set in view of the quantity of reformed gas supplied to the fuel cell. There is a possibility, therefore, that if the load power which quantity exceeds the original supply limit of the load power is taken out from the fuel battery, the fuel cell is disadvantageously damaged.

The present invention has been made through the above-stated studies. It is, therefore, an object of the present invention to provide a fuel cell generation system capable of individually operating a reforming apparatus and a fuel cell at their intended operating pressures, generating power while appropriately maintaining the pressure balance between the reforming apparatus and the fuel cell and effectively preventing the load power exceeding the capability of the fuel cell from being taken out from the fuel cell.

A fuel cell generation system according to the present invention comprises a reforming apparatus reforming material fuel and generating reformed gas that is hydrogen rich; a fuel cell causing a reaction between oxygen containing gas and the reformed gas supplied from the reforming apparatus and generating power; a reformed gas flow rate control section controlling a flow rate of the reformed gas flowing from the reforming apparatus so that an operating pressure of the reforming apparatus is equal to a target pressure thereof; a reformed gas flow rate detecting section detecting a flow rate of the reformed gas flowing into the fuel cell; a target load current calculating section calculating a target load current taken out of the fuel cell in accordance with the flow rate of the reformed gas detected by the reformed gas flow rate detecting section so that the operating pressure of the fuel cell is equal to a target pressure thereof; an inlet pressure detecting section detecting an inlet pressure of the fuel cell; a target load current correction quantity calculating section calculating a load current correction quantity in accordance with a deviation between the inlet pressure of the fuel cell detected by the inlet pressure detecting section and the target pressure of the fuel cell; and a correction quantity adding section adding the target load current calculated by the target load current calculating section and the load current correction quantity calculated by the target load current correction quantity calculating section.

With this configuration, it is possible to operate the reforming apparatus and the fuel cell without carrying a load current exceeding the capability of the fuel cell and while keeping the pressure balance between the reforming apparatus and the fuel cell and maintaining the operating pressures of both the reforming apparatus and the fuel cell to their respective target operating pressures.

In other words, a fuel cell generation system according to the present invention comprises a reforming apparatus reforming material fuel and generating reformed gas that is hydrogen rich; a fuel cell causing a reaction between oxygen containing gas and the reformed gas supplied from the reforming apparatus and generating power; reformed gas flow rate control means for controlling a flow rate of the reformed gas flowing from the reforming apparatus so that an operating pressure of the reforming apparatus is equal to a target pressure thereof; reformed gas flow rate detecting means for detecting a flow rate of the reformed gas flowing into the fuel cell; target load current calculating means for calculating a target load current taken out of the fuel cell in accordance with the flow rate of the reformed gas detected by the reformed gas flow rate detecting means so that the operating pressure of the fuel cell is equal to a target pressure thereof; inlet pressure detecting means for detecting an inlet pressure of the fuel cell; and target load current correcting means for calculating a load current correction quantity in accordance with a deviation between the inlet pressure of the fuel cell detected by the inlet pressure detecting means and the target pressure of the fuel cell and for adding the target load current calculated by the target load current calculating means and the load current correction quantity.

DETAILED DESCRIPTION OF THE PREFERRED EMBODIMENT

Now, the embodiment of the present invention will be described in detail, while appropriately referring to the accompanying drawings.

First, description will be given to the pressure control principles of both a reforming apparatus 1 and a fuel cell 3 based on the block diagram of FIG. 1 which shows the simplified configuration of a fuel cell generation system S in one embodiment according to the present invention.

Figure 1:
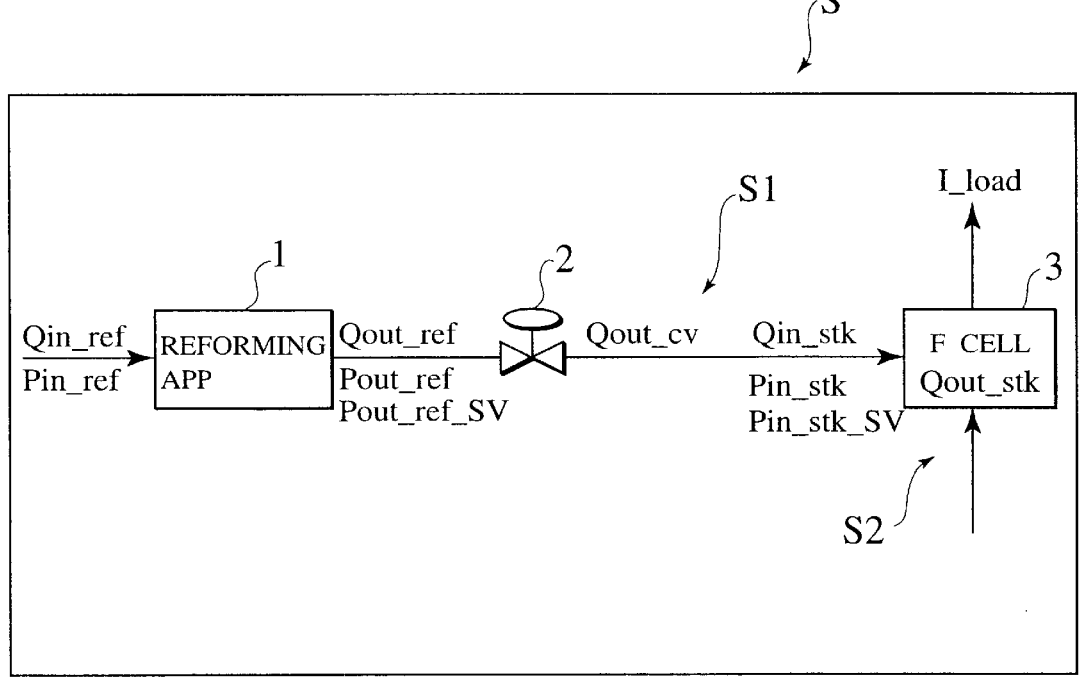
FIG. 1 is a block diagram for describing the pressure control principles of both the reforming apparatus and the fuel cell of a fuel cell generation system in one embodiment according to the present invention.

As shown in FIG. 1, the fuel cell generation system S in this embodiment is comprised of a reformed gas supply system S1 for reforming material fuel, generating reformed gas having a high hydrogen content and supplying the generated reformed gas to a fuel cell 3, and of an oxygen containing gas supply system S2 for supplying oxygen containing gas to the fuel cell 3. The reformed gas supply system S1 is provided with a reforming apparatus 1 generating reformed gas. The reforming apparatus 1 and the fuel cell 3 are caused to communicate with each other through a flow rate control valve 2 which regulates the flow rate of the reformed gas flowing out of the reforming apparatus 1.

First, pressure control in the reforming apparatus 1 will be described.

In this pressure control, the flow rate control valve 2 is controlled such that if the internal pressure of the reforming apparatus 1 becomes lower than a target operating pressure, the target opening of the valve 2 to decrease the opening of the valve 2 is calculated and the quantity of the reformed gas flowing out of the reforming apparatus 1 is thereby appropriately reduced. As a result, the internal pressure of the reforming apparatus 1 can be increased.

Conversely, the flow rate control valve 2 is controlled such that if the internal pressure of the reforming apparatus 1 becomes higher than the target operating pressure, the target valve opening to increase the opening of the valve 2 is calculated and the quantity of the reformed gas flowing out of the reforming apparatus 1 is thereby appropriately increased. As a result, the internal pressure of the reforming apparatus 1 can be reduced.

More specifically, the following operation system is adopted to realize the above-stated pressure control in the reforming apparatus 1.

The pressure balance at the outlet of the reforming apparatus 1 can be expressed by the following equation (1):

$$C1 \times s \times Pout\_ref = Qin\_ref - Qout\_ref \qquad (1).$$

In the equation (1), C1 is the voluminal capacity of the reforming apparatus 1, s is a portion related to a Laplace operator and Pout_ref is the outlet pressure of the reforming apparatus 1. Also, Qin_ref is the flow rate of the material fuel flowing into the reforming apparatus 1 and Qout_ref is the quantity of the gas reformed in the reforming apparatus 1 and then flowing out of the reforming apparatus 1.

To regulate the pressure of the reforming apparatus 1, the above equation (1) may be utilized.

In other words, according to the equation (1), to regulate the pressure Pout_ref of the reforming apparatus 1, the quantity of the substance Qout_ref flowing out of the reforming apparatus 1 may be appropriately regulated based on the fact that the quantity Qin_ref depends on the material fuel introduced into the reforming apparatus 1 according to the variation of an external load and therefore fixed.

Meanwhile, the quantity Qout_ref of the reformed gas flowing out of the reforming apparatus 1 can be expressed by the following equation (2) using the valve opening CVX of the flow rate control valve 2, the pressure Pout_ref of the reforming apparatus 1 and the inlet pressure Pin_stk of the fuel cell 3:

$$Qout\_ref = kp \times (Pout\_ref - Pin\_stk) + kx \times CVX \qquad (2).$$

In the equation (2), CVX is valve opening, kp is a nonlinear gain constant dependent on pressure and kx is a nonlinear gain constant dependent on the valve opening.

As can be understood from the equation (2), as higher the pressure Pout_ref, the larger the quantity Qout_ref according to the first term of the right side of the equation proportional to pressure. The higher the valve opening CVX, the larger the quantity Qout_ref according to the second term of the right side.

Based on the above equations (1) and (2), the outlet pressure Pout_ref of the reforming apparatus 1 can be expressed by the following equation (3):

$$Pout\_ref=(Qin\_ref+kp \times Pin\_stk-kx \times CVX)/(C1 \times s+kp) \quad (3).$$

As can be understood from the equation (3), the outlet pressure Pout_ref of the reforming apparatus 1 can be adjusted to an appropriate value by regulating the valve opening CVX.

Namely, when the valve opening CVX is set smaller, the pressure Pout_ref becomes higher. When the valve opening CVX is set larger, the pressure Pout_ref becomes lower. Then, if the valve opening CVX is set to keep the numerator of the equation (3) to a constant value, it is possible to keep the outlet pressure Pout_ref to an appropriate value.

For example, when the target operating pressure of the reforming apparatus 1 is Pout_ref_SV and the pressure of the reforming apparatus 1 is to be set at the target operating pressure Pout_ref_SV, the following equation (4) is used:

$$CVX=CVX\_1+kg\_ref \times (Pout\_ref\_SV-Pout\_ref) \quad (4).$$

That is, using the equation (4), the target valve opening CVX is calculated and the flow rate control valve 2 is regulated to be set at this valve opening CVX. It is noted that in the equation (4), CVX_1 is a one-time prior calculated value of the valve opening and $kg_{13}$ ref is an regulation parameter.

In the above-stated control principle, therefore, when the internal pressure of the reforming apparatus is lower than the target operating pressure, it can be appropriately increased and if higher, it can be appropriately reduced.

Next, pressure control in the fuel cell 3 will be described.

In this pressure control, when the internal pressure of the fuel cell 3 is higher than a target operating pressure, the quantity of the reformed gas consumed in the fuel cell 3 is increased to allow more load current to be taken out of the cell 3. As a result, the internal pressure of the fuel cell 3 can be reduced.

Conversely, when the internal pressure of the fuel cell 3 is lower than the target operating pressure, the quantity of the reformed gas consumed in the fuel cell 3 is decreased to allow less load current to be taken out of the cell 3. As a result, the internal pressure of the fuel cell 3 can be increased.

Furthermore, as will be described in more detail below, when a target load current set according to the operation so as to make the internal pressure of the fuel cell 3 equal to the target operating pressure exceeds the quantity of current required by the external load, then only the quantity of the excess current is supplied to a charger separately provided to thereby continuously operate the fuel cell 3 while keeping the internal pressure thereof to the target operating pressure and to prevent the supply of overcurrent to the external load.

More specifically, the following operation system is adopted to realize the above-stated pressure control.

First, the pressure balance at the inlet of the fuel cell 3 can be expressed by the following equation (5):

$$C2 \times s \times Pin\_stk=Qout\_cv-Qout\_stk \quad (5).$$

In the equation (5), C2 is the voluminal capacity of the fuel cell 3, s is a portion related to a Laplace operator and Pin_stk is the inlet pressure of the fuel cell 3.

Also, Qout_cv is the quantity of the reformed gas flowing out of the reforming apparatus 1 and passing through the flow rate control valve 2, which is similar to Qout_ref. Qout_stk is the quantity of the reformed gas flowing out of the fuel cell 3.

To regulate the inlet pressure of the fuel cell 3, the above equation (5) may be used. Namely, to regulate the inlet pressure of the fuel cell 3, the quantity Qout_stk of the substance flowing out of the fuel cell 3 may be regulated. The substance flowing out of the fuel cell 3 specifically means the reformed gas consumed within the fuel cell 3. The quantity Qout_stk of the reformed gas flowing out of the fuel cell 3 may be referred to as the quantity of the reformed gas consumed within the fuel cell 3 hereinafter.

In the meantime, the quantity $Qout_{13}$ ref of the reformed gas flowing out of the reforming apparatus 1 turns into the quantity Qout_cv of the reformed gas through the flow rate control valve 2 and then into the quantity Qin_stk of the reformed gas flowing into the fuel cell 3. Due to this, the quantity Qout_cv is equivalent to the quantity Qout_ref and can be expressed in the same manner as the equation (2). The quantity of the reformed gas Qout_cv flowing out of the flow rate control valve 2 can be expressed by the following equation (6) using the valve opening CVX of the flow rate control valve 2, the inlet pressure Pin_stk of the fuel cell 3 and the outlet pressure Pout_ref of the reforming apparatus 1:

$$Qout\_cv=kp \times (Pout\_ref-Pin\_stk)+kx \times cvx \quad (6).$$

In the equation (6), kp is a nonlinear gain constant dependent on pressure and kx is a nonlinear gain constant dependent of valve opening.

As can be seen from the equation (6), the higher the pressure Pin_stk, the smaller the quantity Qout_cv according to the first term of the right side proportional to pressure. The higher the valve opening CVX, the larger the quantity Qout_cv.

Based on the above equations (5) and (6), the inlet pressure Pin_stk of the fuel cell 3 can be expressed by the following equation (7):

$$Pin\_stk=(kp \times Pout\_ref+kx \times CVX-Qout\_stk)/(C2 \times s+kp) \quad (7).$$

In the equation (7), the valve opening CVX is controlled to maintain the pressure of the reforming apparatus 1 provided in the preceding stage and cannot be set, therefore, variable so as to control the pressure of the fuel cell 3 side. Thus, the regulation of the inlet pressure Pin_stk of the fuel cell 3 can be made by regulating the quantity Qout_stk of reformed gas consumed in the fuel cell 3.

Namely, if the quantity Qout_stk is reduced, the pressure Pin_stk is increased. If the quantity Qout_stk is increased, the pressure Pin_stk is reduced. Then, by setting the quantity Qout_stk so as to make the numerator of the equation (7) constant, it is possible to maintain the pressure Pin_stk to an appropriate pressure value.

Furthermore, the quantity Qout_stk of the reformed gas consumed in the fuel cell 3 in the equation (7) is proportional to a load current I_load taken out of the fuel cell 3.

This follows that if the load current I_load taken out of the fuel cell 3 is increased, the quantity Qout_stk is increased. If the load current I_load taken out of the fuel cell 3 is reduced, the quantity Qout_stk is reduced.

The above-stated relationship can be expressed by the following equation (8):

$$Q\text{out\_stk} = ks \times I\_\text{load} \qquad (8).$$

In the equation (8), ks is a proportional constant.

Namely, according to the equation (7), the inlet pressure Pin_stk of the fuel cell 3 can be expressed by the following equation (9) while using the equation (8):

$$\text{Pin\_stk} = (kp \times \text{Pout\_ref} + kx \times CVX - ks \times I\_\text{load})/(C2 \times 2 + kp) \qquad (9).$$

As can be seen from the above equation (9), the pressure Pin_stk can be regulated by regulating the load current I_load. Then, when a target load current I_load_SV is set so as to consume the quantity of the reformed gas flowing into the fuel cell 3 and the numerator of the equation (9) is made constant, then the inlet pressure of the fuel cell 3 can be kept to an appropriate value.

Further, the target load current I_load_SV can be expressed by the following equation (10):

$$I\_\text{load\_SV} = F\_\text{stk} \times Q\text{out\_cv} \qquad (10).$$

In the equation (10), F_stk is a function expressing the relationship between the quantity of the hydrogen rich, reformed gas flow Qout_cv flowing into the fuel cell 3 and the load current I_load.

Accordingly, while also referring to the equation (8), if the load current is taken out of the fuel cell 3 so as to satisfy the relationship of I_load_SV=ks*I_load, the quantity of the reformed gas Qout_stk consumed in the fuel cell 3 is regulated and the inlet pressure Pin_stk of the fuel cell 3 can be thereby regulated to the target operating pressure Pin_stk_SV.

Additionally, while also referring to the equation (10), the target load current is calculated from the function which expresses the relationship between the quantity of the reformed gas flowing into the fuel cell 3 and the load current, thereby making it possible to effectively suppress the load current exceeding the capability of the fuel cell 3 from being taken out of the cell 3.

Now, consideration will be given to a case where the target operating pressure Pin_stk_SV of the fuel cell 3 is changed while such pressure control is being carried out.

In that case, there occurs a deviation between the inlet pressure Pin_stk of the fuel cell 3 and the target operating pressure Pin_stk_SV. Thus, the target load current I_load_SV is corrected using a correction quantity AΔ_load so that the inlet pressure Pin_stk of the fuel cell 3 is equal to the target operating pressure Pin_stk_SV.

The correction quantity Δ_load is calculated using the following equation (11):

$$\Delta\_\text{load} = k\_\text{alpha} \times (\text{Pin\_stk} - \text{Pin\_stk\_SV}) \qquad (11).$$

In the equation (11), k_alpha is a regulation parameter.

Thereafter, using the following equation (12), the correction quantity Δ_load is added to the original target load current I_load_SV and a final target load current I_load_SV_new is obtained:

$$I\_\text{load\_SVnew} = I\_\text{load\_SV} + \Delta\_\text{load} \qquad (12).$$

More specifically, in case of reducing the inlet operating pressure Pin_stk of the fuel cell 3, the gradient of the function for calculating the target load current I_load_SV expressed by the equation (10), i.e., the gradient of the function F_stk which represents the relationship between the quantity of the reformed gas Qout_cv flowing into the fuel cell 3 and the load current I_load is changed so as to increase the target load current I_load_SV.

Conversely, in case of increasing the inlet operating pressure Pin_stk of the fuel cell 3, the gradient of the function F_stk is changed to reduce the target load current I_load_SV.

According to the control principle stated above, therefore, when the inlet operating pressure of the fuel cell 3 is higher than the target value, a correction is made by increasing the target load current to thereby reduce the inlet operating pressure. When the inlet operating pressure of the fuel cell 3 is lower than the target value, a correction is made by reducing the target load current to thereby reduce the inlet operating pressure. In this way, the inlet pressure of the fuel cell 3 can be maintained to the target value.

Next, description will be given to the more detailed configuration of the fuel cell generation system S for controlling the pressures of the reforming apparatus 1 and of the fuel cell 3 by applying the above-stated control principle, with reference to FIG. 2.

Figure 2:
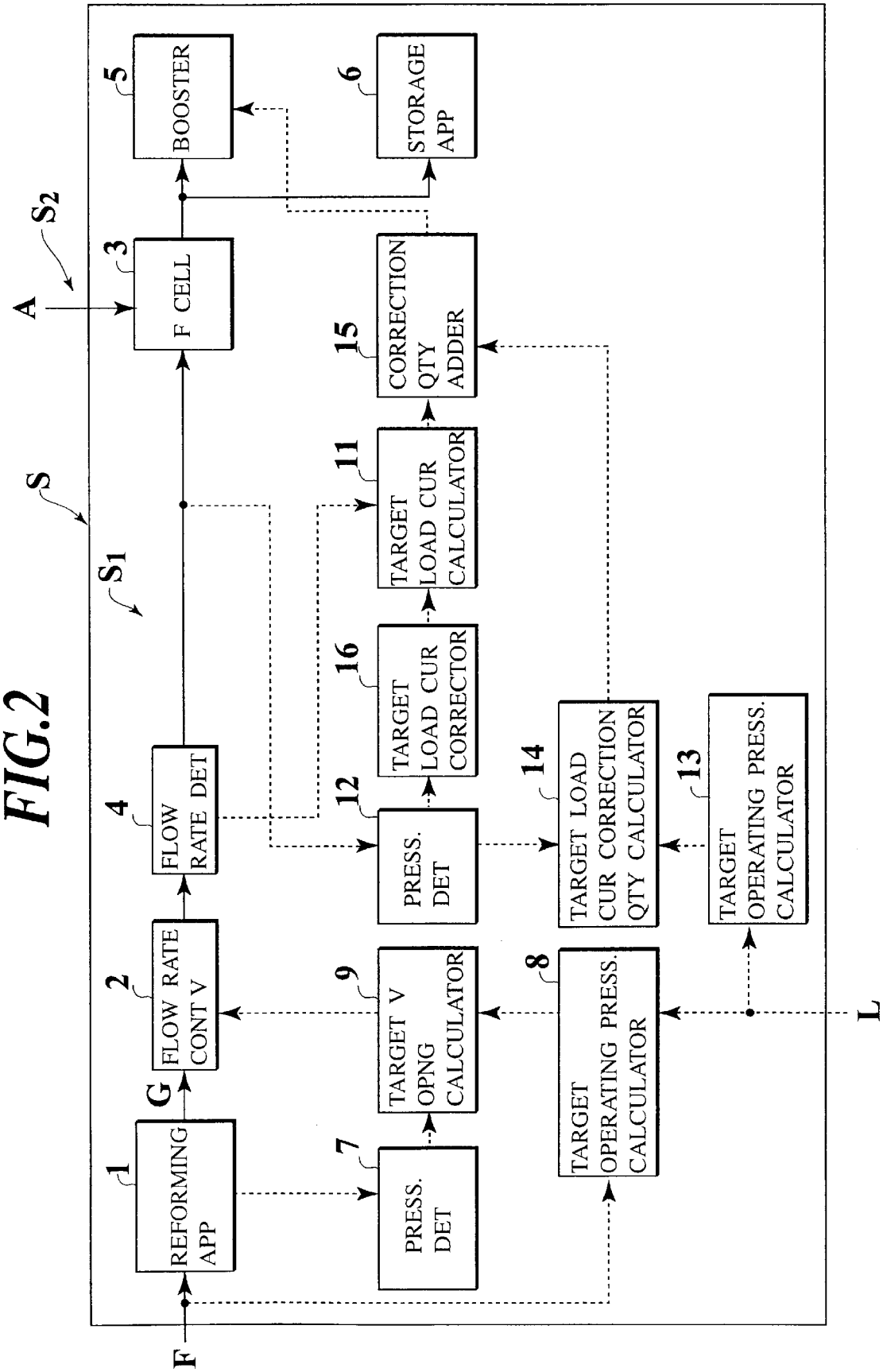
FIG. 2 is a block diagram showing the configuration of the fuel cell generation system in the embodiment according to the present invention.

The fuel cell generation system S shown in FIG. 2 comprises the reforming apparatus 1 reforming a material fuel F supplied from a material fuel supply source which is not shown therein by means of a catalytic reaction and generating hydrogen rich, reformed gas G, a flow rate regulation valve 2 regulating the flow rate of the reformed gas G flowing out of the reforming apparatus 1, a flow rate detector 4 detecting the flow rate of the reformed gas G flowing out of the flow rate regulation valve 2, the fuel cell 3 for causing the reformed gas G flowing through the flow rate regulation valve 2 and the flow rate detector 4 from the reforming apparatus 1 to enter the fuel cell 3 and to be reacted to air A which is an oxygen containing gas supplied from an air supply source which is not shown therein to thereby generate power, a booster 5 boosting the power generated by the fuel cell 3 and supplying the boosted power to an external load, and a storage apparatus 6 such as, for example, a battery, connected in parallel with the booster 5 with respect to the fuel cell 3.

A system starting at the material fuel supply source and generating and supplying reformed gas to the fuel cell 3 is a reformed gas supply system S1. A system starting at the air supply source and supplying the air A to the fuel cell 3 is an oxygen containing gas supply system S2.

In relation to the reforming apparatus 1, there are provided a reforming apparatus outlet pressure detector 7 for detecting the outlet pressure of the reformed gas G, a target operating pressure calculator 8 calculating the target operating pressure of the reforming apparatus 1 by means of a predetermined operation for a required load power L provided from the outside of the system S and a target valve opening calculator 9 operating valve opening necessary to regulate the flow rate of the reformed gas G flowing out of the reforming apparatus 1 based on the difference between the outlet pressure detected by the reforming apparatus outlet pressure detector 7 and the reforming apparatus target operating pressure calculated by the target operating pressure calculator 8.

With relation to the fuel cell 3, there are provided a target load current calculator 11 calculating a target load current to be generated by the fuel cell 3 based on the flow rate of the reformed gas G to flow into the fuel cell 3 which flow rate is detected by the flow rate detector 4, a fuel cell inlet pressure detector 12 detecting the inlet pressure of the reformed gas G flowing into the fuel cell 3, a target operating pressure calculator 13 calculating the target operating pressure of the fuel cell 3 for the externally required load power L, a target load current correction quantity calculator 14 calculating the correction quantity of the target load current based on the difference between the fuel cell inlet pressure calculated by the fuel cell inlet pressure detector 12 and the fuel cell target operating pressure calculated by the target operating pressure calculator 13, and a correction quantity adder 15 adding the correction quantity calculated by the target load current correction quantity calculator 14 to the fuel cell target load current calculated by the target load current calculator 11. The output of the correction quantity adder 15 is applied to the booster 5 as the final target load current of the fuel cell 3.

Furthermore, a target load current corrector 16 is provided between the fuel cell inlet pressure detector 12 and the target load current calculator 11. When the fuel cell. pressure detected by the fuel cell inlet pressure detector 12 is higher than the target operating pressure, the target load current corrector 16 makes a correction by increasing the target load current with respect to the flow rate of the reformed gas G to accelerate a power generating reaction in the fuel cell 3 and by increasing the gradient of the function representing the relationship between the flow rate of the reformed gas G and the target load current both referred to by the target load current calculator 11, so as to reduce the pressure of the fuel cell 3. Conversely, when the fuel cell pressure is lower than the target operating pressure, the target load current corrector 16 performs correction by reducing the target load current with respect to the flow rate of the reformed gas and by decreasing the gradient of the function representing the relationship between the flow rate of the reformed gas G and the target load current both referred to by the target load current calculator 11, so as to increase the pressure of the fuel cell 3.

The operation of the fuel cell generation system S configured as stated above will be described hereinafter.

A material fuel F containing methanol as a main component is supplied to the reforming apparatus 1.

The reforming apparatus 1 performs a reforming reaction to the material fuel F and generates hydrogen rich, reformed gas G.

The hydrogen rich, reformed gas G is supplied from the reforming apparatus 1 through the flow rate control valve 2 to the fuel cell 3.

The fuel cell 3 causes the air A as the oxygen containing gas differently supplied from the air supply unit which is not shown to be reacted to the reformed gas G from the reforming apparatus 1, and thereby generates power.

Thereafter, the load current flowing from the fuel cell 3 through the booster 5 is applied to the external load which is not shown to thereby supply the load power corresponding to the external load.

Now, the pressure regulation of the reforming apparatus 1 is as follows.

The reforming apparatus pressure detector 7 measures the outlet pressure of the reforming apparatus.

The target operating pressure calculator 8 obtains a target operating pressure corresponding to the supply quantity of the material fuel F based on the function representing the relationship between the quantity of the material fuel F supplied from the reforming apparatus 1 and the target operating pressure of the reforming apparatus 1, and gives the obtained target operating pressure to the target valve opening calculator 9. It is noted that not the above-stated function but a function representing the relationship between the load power L required by the external load and the target operating pressure of the reforming apparatus 1 may be used. This is because the material fuel F supplied to the reforming apparatus 1 is introduced in accordance with the power required by the external load.

The target valve opening calculator 9 obtains the target valve opening using the equation (4) in accordance with the deviation between the target operating pressure value calculated by the target operating pressure calculator 8 and the measurement value of the outlet pressure of the reforming apparatus 1 obtained by the reforming apparatus pressure detector 7, i.e., so as to make the difference between the target operating pressure and the outlet pressure become zero.

To be specific, when the pressure measured by the reforming apparatus pressure detector 7 is higher than the target operating pressure, the target valve opening calculator 9 calculates the target valve opening to increase the valve opening so that the quantity of the hydrogen rich, reformed gas G flowing out of the reforming apparatus is increased to thereby reduce the internal pressure of the reforming apparatus 1. Conversely, when the pressure measured by the reforming apparatus pressure detector 7 is lower than the target operating pressure, the target valve opening calculator 9 calculates the target valve opening to reduce the valve opening so that the quantity of the reformed gas G flowing out of the reforming apparatus is reduced to thereby increase the internal pressure of the reforming apparatus 1.

Then, the target valve opening calculator 9 also controls the opening of the flow rate control valve 2 by using the target valve opening thus calculated so that the valve. opening of the flow rate control valve 2 is equal to the target valve opening.

Next, the pressure regulation of the fuel cell 3 is as follows.

The target load current calculator 11 calculates a target load current taken out of the fuel cell 3 based on the function representing the relationship between the flow rate of the reformed gas G flowing into the fuel cell 3 which flow rate is detected by the flow rate detector 4 and the load current.

The load current taken out of the fuel cell 3 is determined by the reaction quantity by which hydrogen and oxygen react to each other within the fuel cell 3. Due to this, the load current which can be taken out of the fuel cell 3 mainly depends on the quantity of the refine gas G flowing into the fuel cell 3. In this embodiment, therefore, the target load current taken out of the fuel cell 3 is set based on the quantity of the reformed gas G flowing into the fuel cell 3 using the equation (10), which does not mean that the load current higher than the load current which can be taken out of the fuel cell 3 is taken out.

The target operating pressure calculator 13 calculates a target operating pressure based on the function representing the relationship between the load power required by the external load and the target operating pressure of the fuel cell 3.

The target load current correction quantity calculator 14 calculates the correction quantity of the target load current using the equation (11) in accordance with the deviation between the inlet pressure of the fuel cell 3 detected by the fuel cell inlet pressure detector 12 and the target operating pressure calculated by the fuel cell target operating pressure calculator 13, i.e., so as to make the difference between the inlet pressure and the target operating pressure become zero.

More specifically, when the pressure detected by the fuel cell inlet pressure detector 12 is higher than the target operating pressure, the calculator 14 calculates a correction quantity for increasing the target load current so as to increase the quantity of the reformed gas G consumed in the fuel cell 3 to thereby reduce the inlet pressure. Conversely, when the pressure detected by the fuel cell inlet pressure detector 12 is lower than the target operating pressure, the calculator 14 calculates a correction quantity for reducing the target load current so as to reduce the quantity of the reformed gas G consumed in the fuel cell 3 to thereby increase the inlet pressure.

If the system operates while maintaining the target operating pressure of the fuel cell 3, it can be said that the system is in a balanced state in which the quantity of the reformed gas G, corresponding to that flowing into the fuel cell 3 and the quantity, is consumed in the fuel cell 3 and taken out as the load current.

In contrast, when the pressure of the fuel cell 3 is higher or lower than the target operating pressure, it can be said that the system is imbalanced.

Furthermore, when the internal pressure of the fuel cell 3 is higher than the target operating pressure, the quantity of the reformed gas G consumed in the fuel cell 3 is lower than that of the reformed gas G supplied from the reforming apparatus 1. This state tends to occur at the transient time at which the target operating pressure is reset at a low value. In this case, the fuel cell 3 has a capability of supplying an excessive load current. Due to this, even if the target load current is increased so that the internal pressure of the fuel cell 3 is reduced down to the target operating pressure, the load current exceeding the capability of the fuel cell 3 is not taken out therefrom.

Conversely, the state in which the internal pressure of the fuel cell 3 is lower than the target operating pressure means a state in which the quantity of the reformed gas G consumed in the fuel cell 3 is larger than that of the reformed gas G supplied from the reforming apparatus 1.

In this embodiment, the above-described state does not occur in stationary operation, either. This is because the target load current is set according to the quantity of the reformed gas G flowing into the fuel cell 3 and the quantity of the reformed gas G consumed in the fuel cell 3 is thereby regulated. In other words, in stationary operation, the load current cannot be taken out excessively in principle and the quantity of reformed gas G consumed in the fuel cell 3 cannot be excessive in principle.

In this embodiment, therefore, the state in which the internal pressure of the fuel cell 3 is lower than the target operating pressure may take place at the transient time at which the target operating pressure is reset to be a higher value. In such a state, the target load current is reduced so that the pressure of the fuel cell 3 equals the target operating pressure and the quantity of the reformed gas G consumed in the fuel cell 3 is regulated to keep balance with the quantity of the reformed gas G supplied to the fuel cell 3. In this case, too, it is prevented to take out the load current exceeding the capability of the fuel cell 3.

Then, to maintain the pressure of the fuel cell 3 to the target value, if the load current exceeding the current corresponding to the load power required by the external load is taken out of the fuel cell, the excessive quantity among the load current is led to and collected by the storage apparatus 6, thereby preventing the excessive load current from being unnecessarily supplied to the external load.

As stated above, the target load current correction quantity calculated by the target load current correction quantity calculator 14 is added to the target load current outputted from the target load current calculator 11 by the correction quantity adder 15 using the equation (12), thereby correcting the target load current. The target load current thus corrected is set, as the final target load current of the fuel cell 3, to the booster 5. The fuel cell 3 operates so that it can generate power in accordance with this final target load current. The generated load current is fed to the booster 5 and supplied to the external load from the booster 5.

Moreover, in this embodiment, if the pressure of the fuel cell 3 is higher than the target value, the target load current corrector 16 increases the gradient of the function which is expressed by the equation (10) and which represents the relationship between the load current and the quantity of the reformed gas G flowing into the fuel cell 3 so that the target load current is increased to thereby increase the quantity of the reformed gas G consumed in the fuel cell 3 and to effectively reduce the pressure of the fuel cell 3.

As a result, when the target load current calculator 11 calculates a target load current using the equation (10), it is possible to set a higher target load current with respect to the quantity of the inflow reformed gas G, to increase the quantity of the reformed gas G consumed in the fuel cell 3 and consequently to reduce the pressure of the fuel cell 3 more effectively.

On the other hand, when the pressure of fuel cell 3 is lower than the target value, the target load current corrector 16 decreases the gradient of the function expressed by the equation (10) so that the target load current is reduced to thereby reduce the quantity of the reformed gas G consumed in the fuel cell and to effectively increase the pressure of the fuel cell 3.

As a result, when the target load current calculator 11 calculates a target load current using the equation (10), it is possible to set a lower target load current with respect to the quantity of the reformed gas G, to reduce the quantity of the reformed gas G consumed in the fuel cell 3 and consequently to increase the pressure of the fuel cell 3 more effectively.

The entire contents of a Patent Application No. TOKUGANHEI 11-55855, with a filing date of Mar. 3, 1999 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A fuel cell generation system comprising:

a reforming apparatus reforming material fuel and generating reformed gas that is hydrogen rich;

a fuel cell causing a reaction between oxygen containing gas and the reformed gas supplied from the reforming apparatus and generating power;

a reformed gas flow rate control section controlling a flow rate of the reformed gas flowing from the reforming apparatus so that an operating pressure of the reforming apparatus is equal to a target pressure thereof;

a reformed gas flow rate detecting section detecting a flow rate of the reformed gas flowing into the fuel cell;

a target load current calculating section calculating a target load current taken out of the fuel cell in accordance with the flow rate of the reformed gas detected by the reformed gas flow rate detecting section so that an operating pressure of the fuel cell is equal to a target pressure thereof;

an inlet pressure detecting section detecting an inlet pressure of the fuel cell;

a target load current correction quantity calculating section calculating a load current correction quantity in accordance with a deviation between the inlet pressure of the fuel cell detected by the inlet pressure detecting section and the target pressure of the fuel cell; and a correction quantity adding section adding the target load current calculated by the target load current calculating section and the load current correction quantity calculated by the target load current correction quantity calculating section.

2. A fuel cell generation system according to claim 1, further comprising a storage section storing power, in the power generated by the fuel cell, corresponding to an excess quantity exceeding a load current required by an external load.

3. A fuel cell generation system according to claim 1, wherein the target load current correction quantity calculating section calculates the load current correction quantity necessary to make zero a difference between the inlet pressure of the fuel cell detected by the inlet pressure detecting section and the target pressure of the fuel cell.

4. A fuel cell generation system according to claim 1, wherein the reformed gas flow rate control section has a valve regulating the flow rate of the reforming apparatus.

5. A fuel cell generation system according to claim 4, further comprising an outlet pressure detecting section detecting an output pressure of the reforming apparatus; and a valve opening calculating section calculating a target opening of the valve in accordance with a deviation between the outlet pressure of the reforming apparatus detected by the outlet pressure detecting section and the target pressure of the reforming apparatus.

6. A fuel cell generation system according to claim 5, wherein the valve opening calculating section calculates the target opening of the valve so that a difference between the outlet pressure of the reforming apparatus detected by the outlet pressure detecting section and the target pressure of the reforming apparatus become zero.

7. A fuel cell generation system according to claim 1, further comprising a reformed gas target pressure calculating section calculating the target pressure of the reforming apparatus in accordance with a load quantity required by the external load or a quantity of the material fuel supplied to the reforming apparatus.

8. A fuel cell generation system according to claim 1, further comprising a target load current correcting section performing a correction to change a gradient of a function representing a relationship between the flow rate of the reformed gas flowing into the fuel cell and the target load current, the function being used by the target load current calculating section.

9. A fuel cell generation system according to claim 1, wherein the material fuel includes methanol as a main component.

10. A fuel cell generation system according to claim 1, wherein the oxygen containing gas is air.

11. A fuel cell generation system, comprising:

a reforming apparatus reforming a material fuel and generating reformed gas that is hydrogen rich;

a fuel cell causing a reaction between an oxygen containing gas and the reformed gas supplied from the reforming apparatus and generating power;

reformed gas flow rate control means for controlling a flow rate of the reformed gas flowing from the reforming apparatus so that an operating pressure of the reforming apparatus is equal to a target pressure thereof;

reformed gas flow rate detecting means for detecting a flow rate of the reformed gas flowing into the fuel cell;

target load current calculating means for calculating a target load current taken out of the fuel cell in accordance with the flow rate of the reformed gas detected by the reformed gas flow rate detecting means so that the operating pressure of the fuel cell is equal to a target pressure thereof;

inlet pressure detecting means for detecting an inlet pressure of the fuel cell; and target load current correcting means for calculating a load current correction quantity in accordance with a deviation between the inlet pressure of the fuel cell detected by the inlet pressure detecting means and the target pressure of the fuel cell and for adding the target load current calculated by the target load current calculating means and the load current correction quantity.

12. A fuel cell generation system according to claim 11, further comprising storage means for storing power, in the power generated by the fuel cell, corresponding to an excess quantity exceeding a load current required by an external load.

* * * * *